United States Patent
Ito et al.

(10) Patent No.: US 8,705,053 B2
(45) Date of Patent: Apr. 22, 2014

(54) IMAGE PROCESSING APPARATUS, IMAGE PROCESSING SYSTEM, AND METHOD FOR CONTROLLING IMAGE PROCESSING APPARATUS AND ACCESSING STORAGE DEVICE EMPLOYING EMULATION

(75) Inventors: Hiroyasu Ito, Okazaki (JP); Ichiro Bessho, Okazaki (JP); Harumitsu Fujimori, Machida (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 704 days.

(21) Appl. No.: 12/486,371

(22) Filed: Jun. 17, 2009

(65) Prior Publication Data

US 2009/0316177 A1    Dec. 24, 2009

(30) Foreign Application Priority Data

Jun. 18, 2008   (JP) ................................. 2008-159219

(51) Int. Cl.
  *G06F 3/12*   (2006.01)

(52) U.S. Cl.
  USPC ............. 358/1.13; 358/1.15; 73/27; 709/201; 709/212; 710/15; 718/1; 726/2

(58) Field of Classification Search
  USPC ......................................................... 358/1.13
  See application file for complete search history.

(56) References Cited

U.S. PATENT DOCUMENTS

| | | | |
|---|---|---|---|
| 6,687,836 B1 * | 2/2004 | Butler ................................. | 726/7 |
| 6,993,649 B2 | 1/2006 | Hensley | |
| 8,028,040 B1 | 9/2011 | Hobbs et al. | |
| 2002/0018234 A1 * | 2/2002 | Fu et al. ........................ | 358/1.15 |
| 2002/0051178 A1 * | 5/2002 | Nakayasu et al. ............ | 358/1.15 |
| 2003/0014669 A1 * | 1/2003 | Caceres et al. ................. | 713/201 |
| 2003/0028405 A1 * | 2/2003 | Chapman et al. ................. | 705/4 |
| 2004/0266529 A1 * | 12/2004 | Chatani ........................... | 463/40 |
| 2005/0015540 A1 * | 1/2005 | Tsai et al. ...................... | 711/103 |
| 2006/0046819 A1 * | 3/2006 | Nguyen et al. ................... | 463/16 |

(Continued)

FOREIGN PATENT DOCUMENTS

| | | |
|---|---|---|
| JP | 2001-138584 A | 5/2001 |
| JP | 2001-157011 A | 6/2001 |

(Continued)

OTHER PUBLICATIONS

Decision to Grant Patent from Japanese Patent Office issued in Applicant's corresponding Japanese Patent Application No. 2008-160108 dated Aug. 3, 2010, and English Translation thereof.

(Continued)

*Primary Examiner* — King Poon
*Assistant Examiner* — David S Cammack
(74) *Attorney, Agent, or Firm* — Buchanan Ingersoll & Rooney PC

(57) ABSTRACT

Attachment of a USB memory is sensed and whether the USB memory can be recognized or not is determined based on data information output from the USB memory. When the USB memory cannot be recognized, an emulation transition screen is displayed. Thereafter, when an instruction to start transition to an emulation mode is given, an emulation mode transition instruction signal and an IP address of an MFP on a network are output. Receiving the input of the emulation mode transition instruction signal, an emulation mode start-up/end unit starts up the emulation mode.

12 Claims, 13 Drawing Sheets

(56) References Cited

U.S. PATENT DOCUMENTS

| | | |
|---|---|---|
| 2006/0123129 A1* | 6/2006 | Toebes et al. ............... 709/230 |
| 2006/0161617 A1* | 7/2006 | Zhong et al. ............... 709/203 |
| 2006/0209337 A1 | 9/2006 | Atobe et al. |
| 2006/0294391 A1* | 12/2006 | Wu ............................ 713/182 |
| 2007/0214369 A1 | 9/2007 | Roberts et al. |
| 2009/0216833 A1* | 8/2009 | Chen et al. ............... 709/203 |

FOREIGN PATENT DOCUMENTS

| | | |
|---|---|---|
| JP | 2004-118237 A | 4/2004 |
| JP | 2006-510995 A | 3/2006 |
| JP | 2006-302257 A | 11/2006 |
| JP | 2008-066935 A | 3/2008 |
| WO | WO 2006/080762 A1 | 8/2006 |

OTHER PUBLICATIONS

Japanese Office Action, dated Jun. 8, 2010, with English-language translation.

Official Action mailed Mar. 12, 2012, in U.S. Appl. No. 12/486,360, (21 pages), U.S. Patent and Trademark Office, Alexandria, VA.

Office Action dated Oct. 17, 2012, issued in U.S. Appl. No. 12/486,360 (23 pages), from U.S. Patent and Trademark Office, Alexandria, VA.

* cited by examiner

IMAGE PROCESSING APPARATUS, IMAGE PROCESSING SYSTEM, AND METHOD FOR CONTROLLING IMAGE PROCESSING APPARATUS AND ACCESSING STORAGE DEVICE EMPLOYING EMULATION

This application is based on Japanese Patent Application No. 2008-159219 filed with the Japan Patent Office on Jun. 18, 2008, the entire content of which is hereby incorporated by reference.

BACKGROUND OF THE INVENTION

1. Field of the Invention

The present invention relates to an image processing apparatus, and particularly to an image processing apparatus and an image processing system including a USB (Universal Serial Bus) connector to which a USB device can be attached.

2. Description of the Related Art

In recent years, a memory card or the like representing a removable external storage device for storing image data or the like has widely been used in a widely used portable information terminal (PDA) (Personal Data Assistance), a digital camera or the like.

In addition, an MFP (Multi Function Peripheral) capable of forming an image based on image data stored in the external storage device has widely been used.

For example, Japanese Laid-Open Patent Publication No. 2001-157011 discloses a technique that can reduce time required before start of image formation when a removable external storage device is attached.

In addition, Japanese Laid-Open Patent Publication No. 2001-138584 also proposes a technique of using an empty area of a removable external storage device as a work memory during printing, and various methods for use have been proposed.

Meanwhile, in recent years, a USB memory has widely been used as a removable external storage device, and data security measures have recently become important. One exemplary measure is to encrypt data for storage. Regarding such a technique, a USB memory including an application area for storing an application for encryption processing (hereinafter also referred to as an encryption application) in addition to a data area so that the data is encrypted and stored by using the encryption application stored in the application area has been introduced.

For example, a USB memory complying with U3 specifications set forth by SanDisk Corporation (hereinafter also referred to as a U3 memory) is available.

For example, as described above, in an example where a U3 memory is divided into a data area and an application area where an encryption application is stored and data in the data area is encrypted with the encryption application for storage, data in the data area cannot be read unless the encryption application stored in the application area within the U3 memory is started up and the encrypted data is decrypted by entering a password or the like.

Here, when such a U3 memory is attached to an MFP, an encryption application stored in the application area should be started up. In many cases, however, the encryption application is adapted to a general-purpose OS (Operating System) generally used in a PC (Personal Computer) (such as WINDOWS®) but not adapted to an embedded OS mounted on the MFP (such as VXWORKS®).

Accordingly, the encryption application within the U3 memory cannot be started up. Namely, data in the data area within the U3 memory cannot be read and that U3 memory cannot be made use of.

SUMMARY OF THE INVENTION

The present invention was made to solve the above-described problems, and an object of the present invention is to provide an image processing apparatus capable of accessing a removable external storage device storing an application not adapted to an OS mounted on the image processing apparatus.

An image processing apparatus according to one aspect of the present invention includes a connector to which a removable external storage device is attachable, a determination unit for determining whether the external storage device is recognizable to the image processing apparatus, based on information output from the external storage device attached to the connector; a display, an operation portion for accepting user's operation input, and an emulation control unit for causing, when the determination unit determines that the external storage device is unrecognizable to the image processing apparatus, the display and the operation portion to emulate a display function and an operation function of an external terminal device, in order to remotely operate the external terminal device connected via a network that is capable of recognizing the external storage device. The emulation control unit includes a data input and output control unit for transmitting and receiving data to and from the external terminal device. The data input and output control unit transfers information output from the external storage device to the external terminal device.

Preferably, the emulation control unit further includes an emulation mode transition unit for switching to an emulation mode in which the display and the operation portion are caused to emulate the display function and the operation function of the external terminal device when the determination unit determines that the external storage device is unrecognizable to the image processing apparatus.

Preferably, the data input and output control unit includes a data output control unit for outputting the information output from the external storage device to the external terminal device, and a data input control unit for receiving input of operation screen information for causing the display to display an operation screen for operating the external storage device of the external terminal device.

In particular, the data output control unit outputs an application program included in the external storage device to the external terminal device. The data input control unit receives input of screen information for causing the display to display a screen displayed on the operation screen of the external terminal device based on the application program started up in the external terminal device.

In particular, the data input control unit receives input of screen information for causing the display to display an input screen for subjecting an encrypted data file included in the external storage device to decryption processing. The data output control unit outputs to the external terminal device, input data for decryption processing of the encrypted data file input in accordance with the input screen displayed on the display of the image processing apparatus.

In particular, the data input control unit receives input of screen information for causing the display to display a file selection screen for performing print processing of a data file included in the external storage device The data output control unit outputs to the external terminal device, file selection input data for print processing of the data file input in accordance with the file selection screen displayed on the operation screen of the image processing apparatus.

An image processing system according to another aspect of the present invention includes an image processing apparatus and an external terminal device connected to the image processing apparatus through a network. The image processing apparatus includes a connector to which a removable external storage device is attachable, a determination unit for determining whether the external storage device is recognizable to the image processing apparatus, based on information output from the external storage device attached to the connector, a display, an operation portion for accepting user's operation input, and an emulation control unit for causing, when the determination unit determines that the external storage device is unrecognizable to the image processing apparatus, the display and the operation portion to emulate a display function and an operation function of the external terminal device, in order to remotely operate the external terminal device connected via the network that is capable of recognizing the external storage device. The emulation control unit includes an emulation mode transition unit for switching to an emulation mode in which the display and the operation portion are caused to emulate the display function and the operation function of the external terminal device when the determination unit determines that the external storage device is unrecognizable to the image processing apparatus, a data output control unit for transferring the information output from the external storage device to the external terminal device, and a data input control unit for receiving input of operation screen information for causing the display to display an operation screen for operating the external storage device of the external terminal device. The external terminal device includes a control unit capable of recognizing the external storage device attached to the connector based on the information output from the external storage device and transferred from the data output control unit, and a data control unit for outputting the operation screen information to the image processing apparatus when the control unit recognizes the external storage device.

Preferably, the data output control unit of the image processing apparatus transfers an application program included in the external storage device to the external terminal device. The control unit of the external terminal device starts up the transferred application program. The data control unit of the external terminal device outputs screen information for causing the display to display a screen based on the started-up application program. The data input control unit of the image processing apparatus receives from the external terminal device, input of the screen information to be displayed on the display.

Preferably, the data output control unit of the image processing apparatus transfers an encrypted data file included in the external storage device to the external terminal device The control unit of the external terminal device starts up an application program for decrypting the encrypted data file. The data control unit of the external terminal device outputs screen information for causing the display to display an input screen for subjecting the encrypted data file to decryption processing based on the started-up application program. The data input control unit of the image processing apparatus receives from the external terminal device, input of the screen information to be displayed on the display.

Preferably, the data output control unit of the image processing apparatus transfers information on a data file included in the external storage device to the external terminal device. The control unit of the external terminal device generates a file selection screen for performing print processing of the data file included in the external storage device based on the transferred information on the data file. The data control unit of the external terminal device outputs to the image processing apparatus, screen information for causing the display to display the file selection screen. The data input control unit of the image processing apparatus receives from the external terminal device, input of the screen information to be displayed on the display.

In particular, the data output control unit of the image processing apparatus outputs to the external terminal device, file selection input data for print processing of the data file input in accordance with the file selection screen displayed on the operation screen of the image processing apparatus. The control unit of the external terminal device converts a selected data file included in the external storage device into print data, based on the file selection input data The data output control unit of the external terminal device sets an address of the image processing apparatus in the emulation mode as a destination of processed print data.

A method of controlling an image processing apparatus according to one aspect of the present invention including a connector to which a removable external storage device is attachable, a display, and an operation portion for accepting user's operation input, includes the steps of: determining whether the external storage device is recognizable to the image processing apparatus, based on information output from the external storage device attached to the connector, causing, when it is determined in the determining step that the external storage device is unrecognizable to the image processing apparatus, the display and the operation portion to emulate a display function and an operation function of an external terminal device, in order to remotely operate the external terminal device connected via a network that is capable of recognizing the external storage device; and transmitting and receiving data to and from the external terminal device In the step of transmitting and receiving data, information of the external storage device attached to the connector is transferred.

According to the image processing apparatus of the present invention, when the external storage device is unrecognizable to the image processing apparatus, the emulation control unit performs processing for remotely operating the external terminal device so that the external storage device can be accessed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
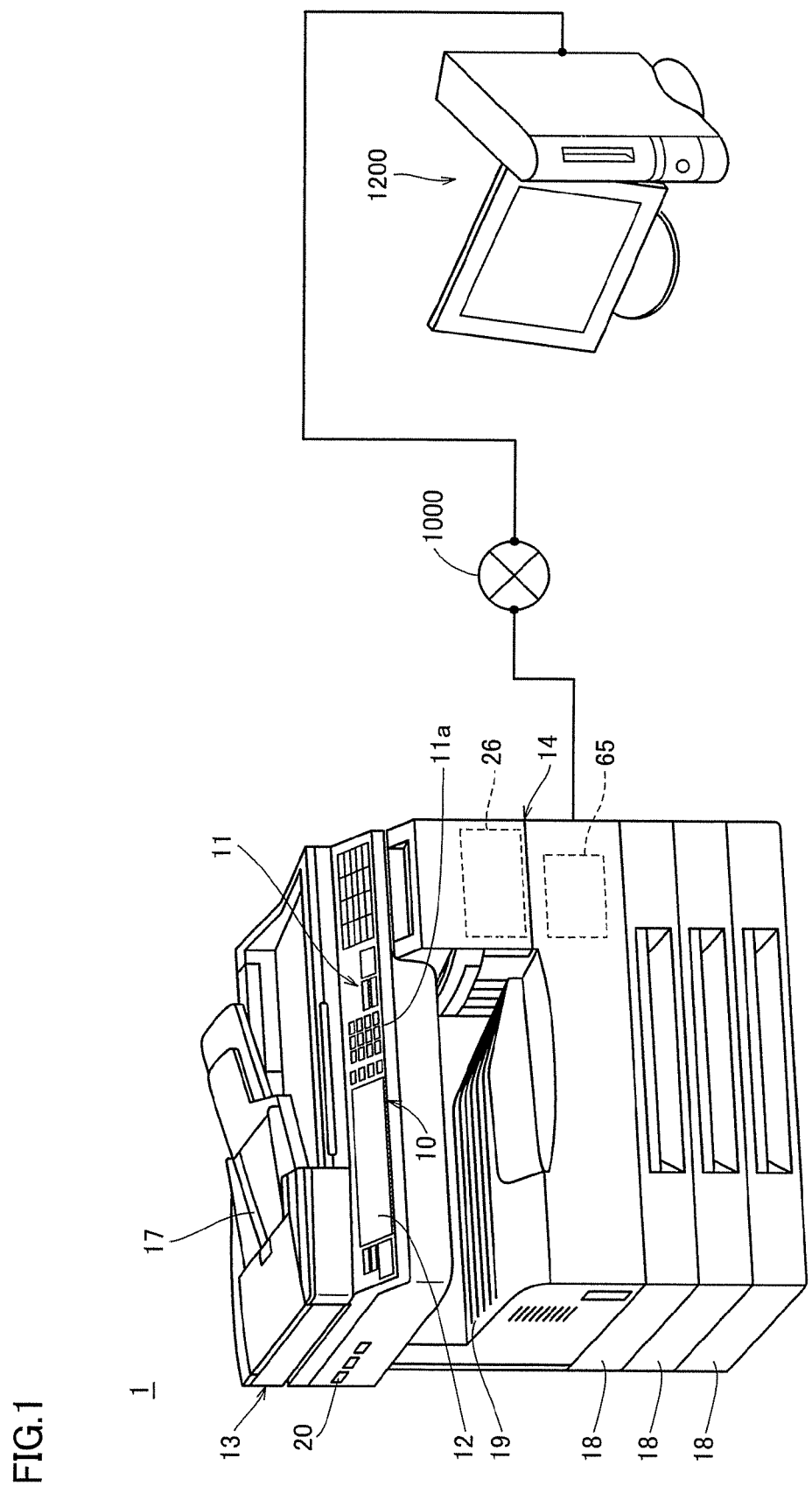
FIG. 1 is a schematic diagram illustrating an image processing system according to an embodiment of the present invention.

An embodiment of the present invention will be described hereinafter with reference to the drawings. In the description below, the same part and component have the same reference characters allotted. Their label and function are also assumed as identical.

An image processing system according to an embodiment of the present invention will be described with reference to FIG. 1.

Referring to FIG. 1, the image processing system according to the embodiment of the present invention includes an MFP 1 and a server 1200 connected to MFP 1 through a network 1000.

MFP 1 is a digital multifunctional machine having a copy function, a scanner function, and a printer function, and various functions are implemented by an embedded OS. On the other hand, in server 1200, various functions are implemented by a general-purpose OS, unlike the embedded OS in MFP 1.

MFP 1 has ports 20 serving as connection means, to which a plurality of (in the present embodiment, three) external storage devices complying with the USB specifications are removably attached, and a USB device including a USB memory, which is a removable external storage device having a USB interface, is connected to this port 20 so that bidirectional data transmission and reception between the external storage device and MFP 1 can be carried out. Port 20 is also hereinafter referred to as a USB port or a USB connector.

In the present embodiment, for example, a case where a USB interface is adopted and a USB memory is connected to the port will be described, however, the interface is not limited to the USB. Connection of other removable external storage devices such as a CF (Compact Flash) card is also similarly applicable. In addition, in the present embodiment, a case where a U3 memory representing a USB memory complying with the USB specifications is attached to port 20 as the USB memory will be described.

MFP 1 includes an operation panel portion 10. Operation panel portion 10 has a plurality of keys 11a, an operation portion 11 for accepting input of data such as various instructions, characters, numerics, and the like provided by user's operation of key 11a, and an operation display 12 implemented by liquid crystals or the like, for display of an instruction menu for the user or information on an obtained image.

MFP 1 includes a scanner 13 for obtaining image data by optically reading a document and a printer 14 for printing an image on a recording sheet based on the image data. In addition, a feeder portion 17 for feeding a document to scanner 13 is provided on an upper surface of a main body of MFP 1, a paper feed portion 18 for supplying a recording sheet to printer 14 is provided in a lower portion thereof, and a tray 19 where a recording sheet having an image printed by printer 14 is provided in a central portion thereof.

In addition, a communication portion 65 for transmitting and receiving image data to and from external equipment, a storage portion 26 for storing a control program used in each unit for controlling the main body and necessary data such as image data, and the like are provided in the main body of MFP 1.

Moreover, communication portion 65 is connected to server 1200 representing the external equipment connected to network 1000.

A configuration of server 1200 will be described later.

Operation display 12 provides display of various modes and others, and various settings and the like can be made in accordance with display contents and the like. In addition, operation portion 11 is used for user's various inputs. These components function as a main part of the user interface.

Scanner 13 obtains image data by photoelectrically reading image information such as a photograph, a character, graphics, and the like from a document The obtained image data (density data) is converted to digital data, subjected to well-known various types of image processing, and sent to printer 14 if an image is to be printed, or transmitted to other external equipment connected to the network through communication portion 65 if image transmission processing is to be performed.

Printer 14 serves to print an image on a recording sheet, based on image data obtained by scanner 13, image data stored in a USB memory or the like representing a removable external storage device, or image data transmitted from external equipment.

Communication portion 65 transmits and receives data to and from server 1200 representing external equipment connected to network 1000 such as LAN (Local Area Network) or the Internet through the public switched telephone network It is noted that communication established by MFP 1 through a network may be any of wire communication and wireless communication.

A functional block diagram of MFP 1 representing the image processing apparatus according to the embodiment of the present invention will be described with reference to FIG. 2.

Figure 2:
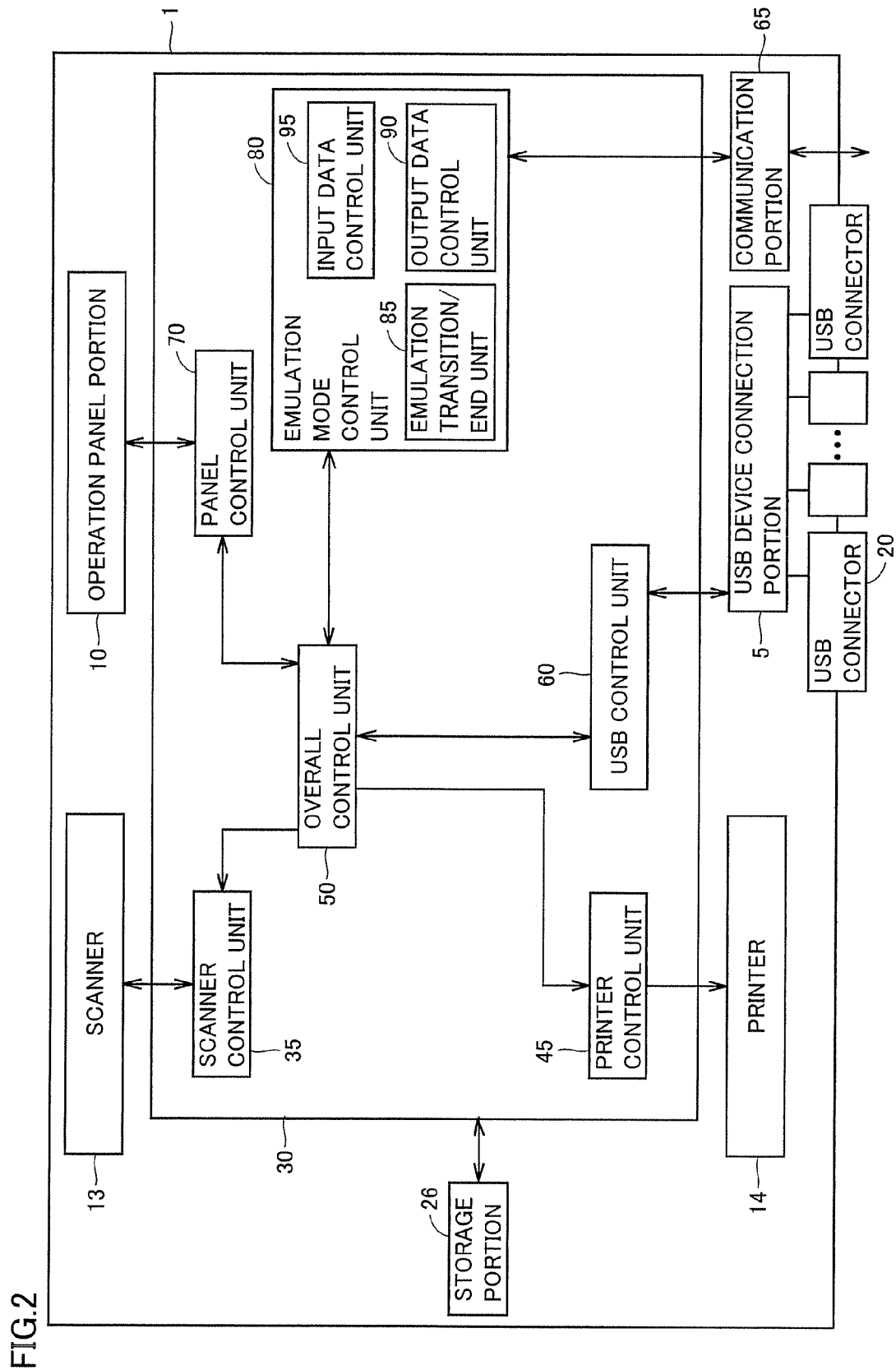
FIG. 2 is a functional block diagram of an MFP representing an image processing apparatus according to the embodiment of the present invention.

Referring to FIG. 2, MFP 1 according to the embodiment of the present invention includes scanner 13 for converting a material such as a paper medium or the like into electronic data, storage portion 26 implemented, for example, by a hard disk (HDD), printer 14 for performing print processing, USB connector 20 for attaching each USB device, a USB device connection portion 5 for controlling connection between USB connector 20 and a USB device, operation panel portion 10 including the operation display, a control unit 30 for overall control of the MFP, and communication portion 65 for transmitting and receiving data to and from server 1200 representing external equipment through network 1000.

When the USB device is attached to USB connector 20, USB device connection portion 5 senses attachment and outputs attachment information on the attached device to control unit 30.

Each functional block of control unit 30 is implemented by reading an embedded OS and various software programs adapted to the embedded OS stored in storage portion 26

Specifically, control unit 30 includes a scanner control unit 35 for controlling scanner 13, a printer control unit 45 for controlling printer 14, a USB control unit 60 for accessing the USB device attached to USB connector 20 through USB device connection portion 5, a panel control unit 70 for accepting display contents to be displayed on operation panel portion 10 and an operation input through operation panel portion 10, an emulation mode control unit 80 for performing processing for controlling an emulation mode which will be described later, and an overall control unit 50 for controlling these units above as a whole and instructing each unit to carry out a prescribed job in response to an operation instruction input from operation panel portion 10. It is noted that overall control unit 50 functions as the embedded OS.

In addition, emulation mode control unit 80 includes an emulation transition/end unit 85 for performing processing for making transition to the emulation mode and ending the emulation mode, an input data control unit 95 for receiving input data from external equipment through communication portion 65 and outputting the input data to overall control unit 50 when transition to the emulation mode is made, and an output data control unit 90 for transmitting the data input from overall control unit 50 to server 1200 representing the external equipment through communication portion 65 when transition to the emulation mode is made.

USB control unit 60 senses a device attached to USB connector 20 through USB device connection portion 5 and outputs information on the device to overall control unit 50.

Overall control unit 50 determines whether the device attached to USB connector 20 can be recognized or not, based on the information on that device output from USB control unit 60. When the device is recognized, access to the device is permitted. Specifically, for example, when a common USB memory is recognized, print processing or the like of stored file data or the like can be performed by providing an instruction to access the USB memory through operation panel portion 10.

Emulation transition/end unit 85 outputs an instruction signal to communication portion 65 in order to perform processing for making transition to the emulation mode or processing for ending the emulation mode in accordance with an operation input through operation panel portion 10, and receives input of an instruction signal from server 1200 connected to the network through communication portion 65.

Input data control unit 95 receives input data input from external equipment through communication portion 65 and outputs the input data to overall control unit 50 when transition to the emulation mode is made.

Output data control unit 90 receives the input data input from overall control unit 50 and transmits the input data to server 1200 representing external equipment through communication portion 65 when transition to the emulation mode is made.

When transition to the emulation mode is made, emulation mode control unit 80 performs emulation processing by using input data control unit 95 and output data control unit 90 so as to emulate a function of server 1200, so that server 1200 can remotely be operated.

A configuration of operation panel portion 10 in MFP 1 according to the embodiment of the present invention will be described with reference to FIG. 3.

Figure 3:
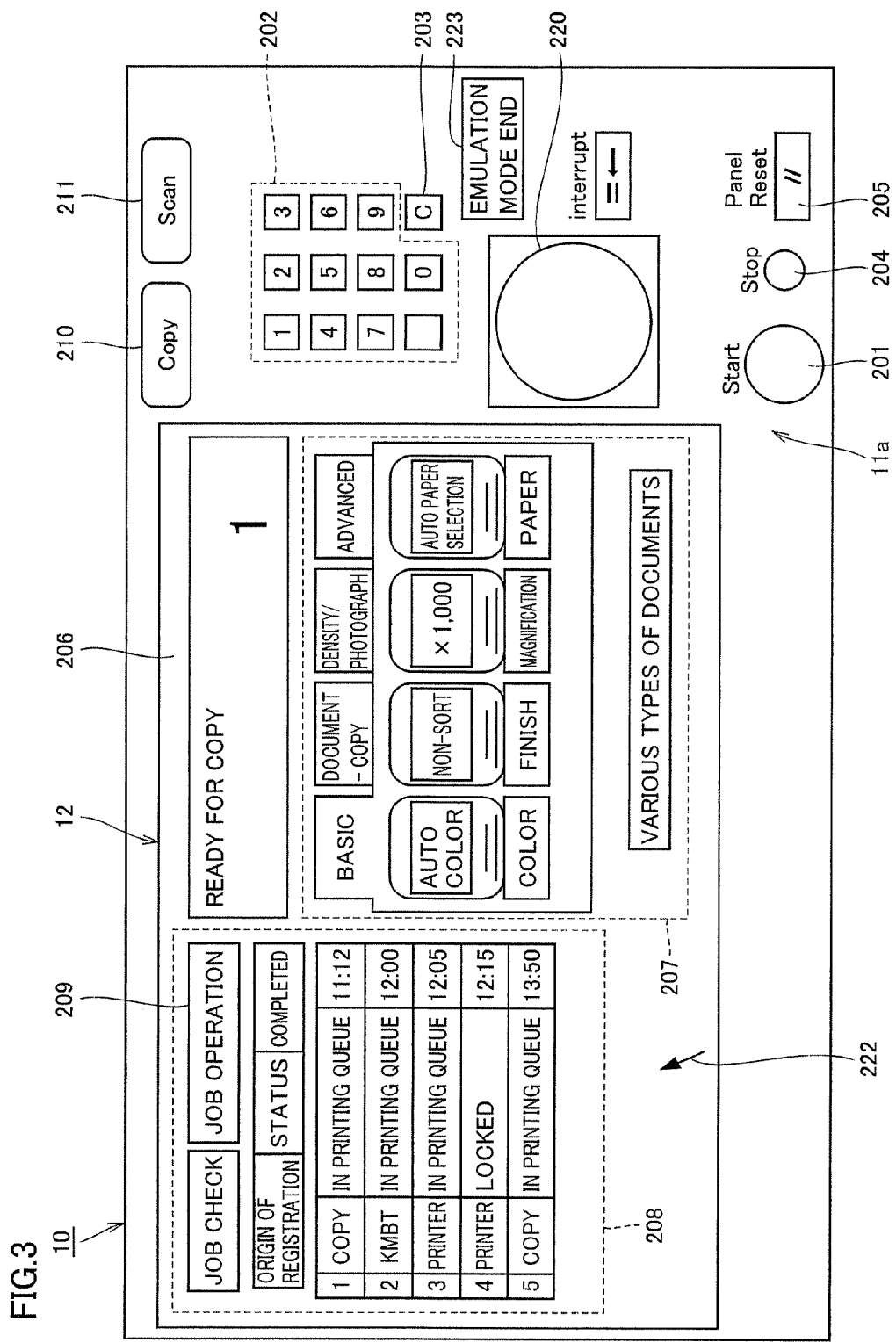
FIG. 3 is a diagram illustrating a configuration of an operation panel portion in the MFP according to the embodiment of the present invention.

Referring to FIG. 3, a start key 201 is used for starting an operation such as copy/scan or the like. A numeric key 202 is used for entering a numeric value or the like such as the number of copies or a password which will be described later. A clear key 203 is used for clearing an entered numeric value and erasing stored image data.

A stop key 204 is used for indicating stop of a copy/scan operation. A panel reset key 205 is used for canceling a set mode and a job. In addition, when stop key 204 is pressed during processing for writing data into the USB device or during data printing, an operation to write data into the USB device or a data printing operation is stopped.

An emulation mode end button 223 is a button for indicating end of the emulation mode when the emulation mode is being executed.

In addition, a trackball 220 is a pointing device for moving pointer 222 when pointer 222 is displayed on operation display 12.

Operation display 12 is provided with a touch panel 206 for display of various modes or for making setting or the like.

Through this touch panel 206, the user can make various settings in accordance with display contents on operation display 12. In addition, in a setting screen area 207 of touch panel 206, normally, buttons for basic/advanced setting that is made in a copy operation or a scanning operation are arranged. When each button is pressed, a screen layer for making detailed setting is displayed. It is noted that an operation as performed with touch panel 206 can be performed by moving a pointer 222 with trackball 220 and then pressing, for example, start key 201.

In a job information screen area 208 of touch panel 206, job information provided to MFP 1 by that time point is displayed. Jobs are displayed in the order of execution. When an operation for canceling or modifying a specific job is to be performed, a job operation button 209 is selected and thereafter a job number button of interest is pressed Through these operations, a job operation screen is displayed and an operation on a specific job can be permitted.

A copy key 210 and a scan key 211 are selection keys for setting whether MFP 1 should operate in any mode of a copier and a scanner.

When copy key 210 is pressed, MFP 1 can be used as a copier. A scanner operation cannot be performed in this state.

Alternatively, when scan key 211 is pressed, MFP 1 serves as a scanner. A copy operation cannot be performed in this state.

Copy key 210 and scan key 211 are mutually exclusive. Therefore, if one is selected, the other is automatically in a non-selected state.

Though the description will be provided later, in the emulation mode, an operation display screen of server 1200 is displayed on display 12.

A functional block diagram of server 1200 according to the embodiment of the present invention will be described with reference to FIG. 4.

Figure 4:
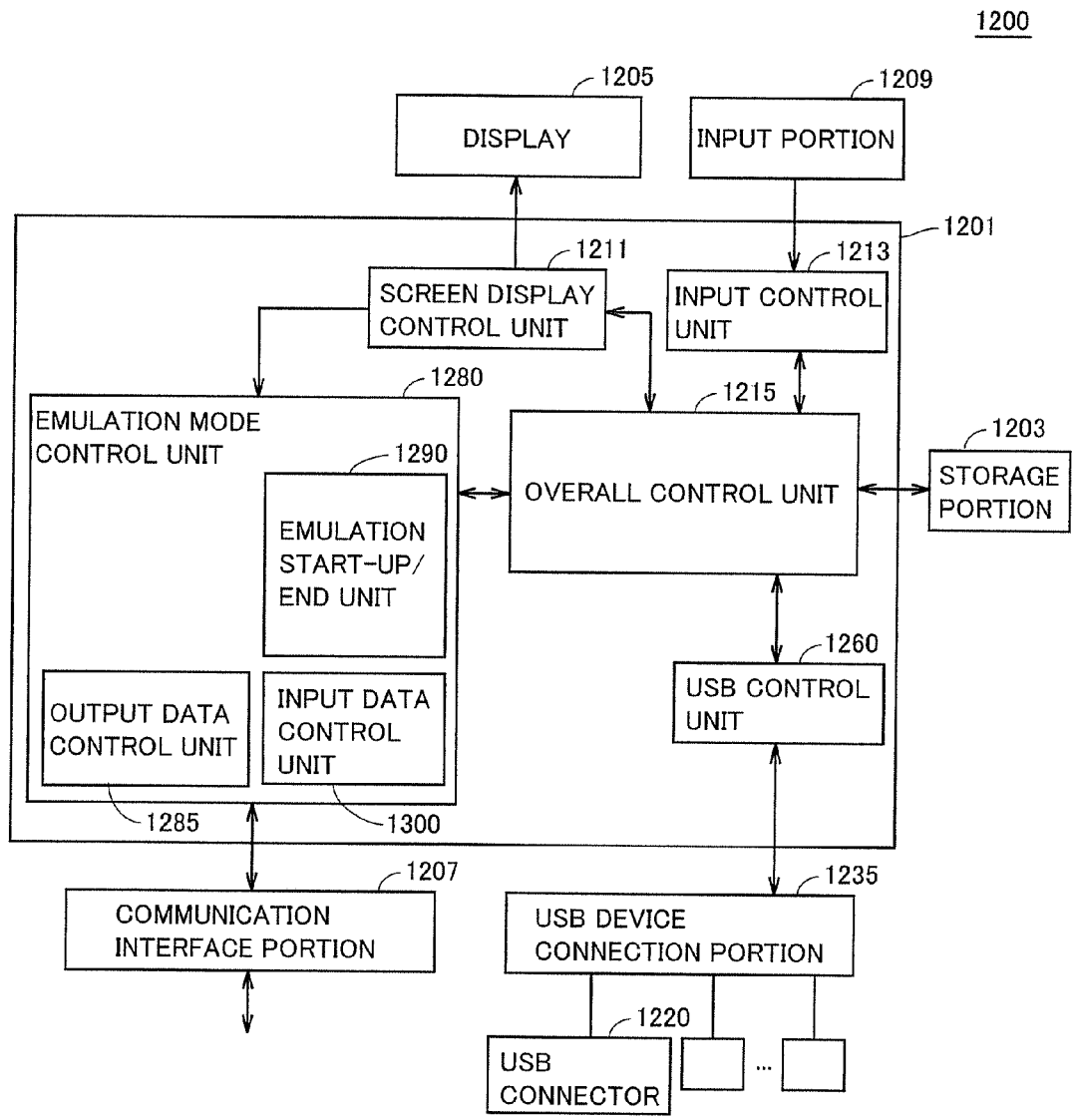
FIG. 4 is a functional block diagram of a server according to the embodiment of the present invention.

Referring to FIG. 4, server 1200 according to the embodiment of the present invention includes an input portion 1209 such as a mouse or a keyboard, a display 1205 for displaying an operation display screen, a communication interface portion 1207 for transmitting and receiving data to and from outside through network 1000, a storage portion 1203 implemented, for example, by a hard disk (HDD), a USB connector 1220 which is a port for connecting, for example, a USB memory representing a removable external storage device, a USB device connection portion 1235 for controlling connection between USB connector 1220 and a USB device, and a control unit 1201 for overall control of server 1200.

When the USB device is attached to USB connector 1220, USB device connection portion 1235 senses attachment and outputs attachment information on the attached device to control unit 1201.

Each functional block of control unit 1201 is implemented by reading a general-purpose OS and various software programs adapted to the general-purpose OS stored in storage portion 1203.

Specifically, control unit 1201 includes a USB control unit 1260 for accessing the USB device attached to USB connector 1220 through USB device connection portion 1235, an input control unit 1213 for accepting an operation input through input portion 1209, a screen display control unit 1211 for controlling display processing or the like of display 1205, and an emulation mode control unit 1280 for performing processing for controlling an emulation mode which will be described later. It is noted that an overall control unit 1215 functions as the general-purpose OS.

In addition, emulation mode control unit 1280 includes an emulation start-up/end unit 1290 for performing processing for starting up the emulation mode and ending the emulation mode, an input data control unit 1300 for receiving input data from MFP 1 representing external equipment through communication interface portion 1207 and outputting the input data to overall control unit 1215 when transition to the emulation mode is made, and an output data control unit 1285 for transmitting the data input from overall control unit 1215 to MFP 1 representing the external equipment through communication interface portion 1207 when transition to the emulation mode is made.

USB control unit 1260 senses a device attached to USB connector 1220 through USB device connection portion 1235 and outputs information on the device to overall control unit 1215.

Overall control unit 1215 determines whether the device attached to USB connector 1220 can be recognized or not, based on the information on that device output from USB control unit 1260. When the device is recognized, access to the device is permitted. Specifically, for example, when a common USB memory is recognized, an instruction or the like to access the USB memory can be provided through input portion 1209 while viewing the operation display screen displayed on display 1205.

Emulation start-up/end unit 1290 outputs an instruction signal to MFP 1 connected to the network through communication interface portion 1207 for performing processing for starting up or ending the emulation mode and receives input of an instruction signal from MFP 1.

A configuration of a U3 memory described in the embodiment of the present invention will be described with reference to FIG. 5.

Figure 5:
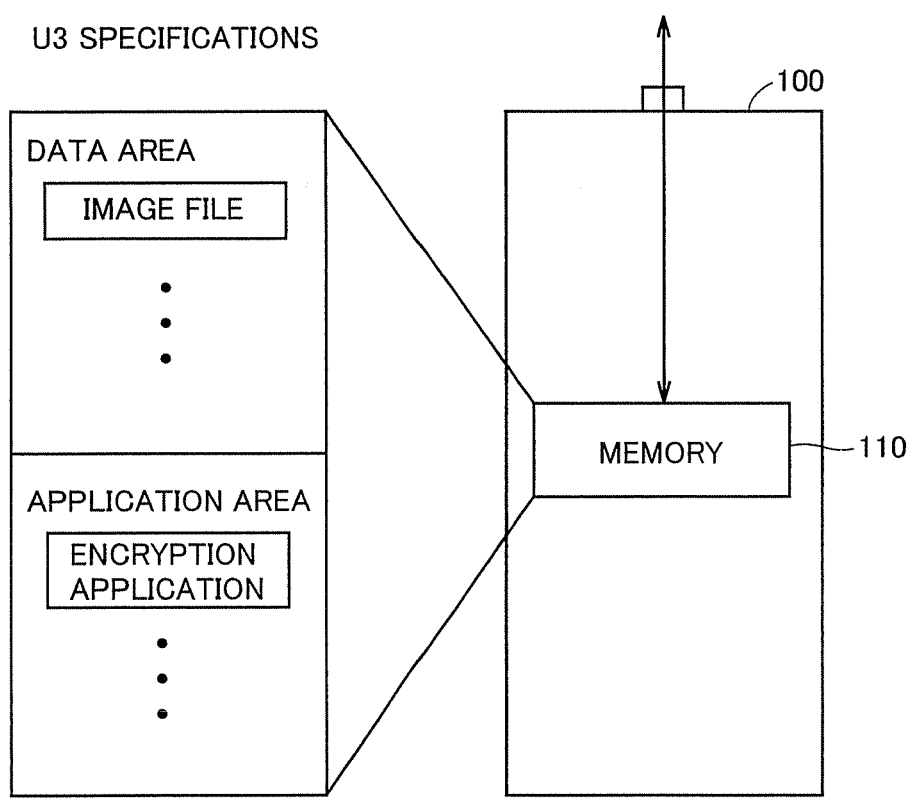
FIG. 5 is a schematic diagram illustrating a configuration of a U3 memory described in the embodiment of the present invention.

Referring to FIG. 5, in the present embodiment, a USB memory complying with the U3 specifications will be described by way of example. A USB memory 100 complying with the U3 specifications includes a memory portion 110 where data is stored, and memory portion 110 is divided into a data area and an application area. As described above, the application area can store an application complying with the U3 specifications, and an example where an encryption application is stored is shown here.

In addition, though an example where an image file is stored in the data area is shown in the present embodiment, the image file is stored in the data area as encrypted with the encryption application.

In the present embodiment, when the U3 memory is attached to USB connector 20, start-up data information of the encryption application which is an application complying with the U3 specifications is output.

In addition, the application in the USB memory complying with the U3 specifications is not adapted to the embedded OS but adapted to the general-purpose OS.

Processing for executing the emulation mode when the USB memory complying with the U3 specifications according to the embodiment of the present invention is attached to MFP 1 will be described with reference to FIG. 6.

Figure 6:
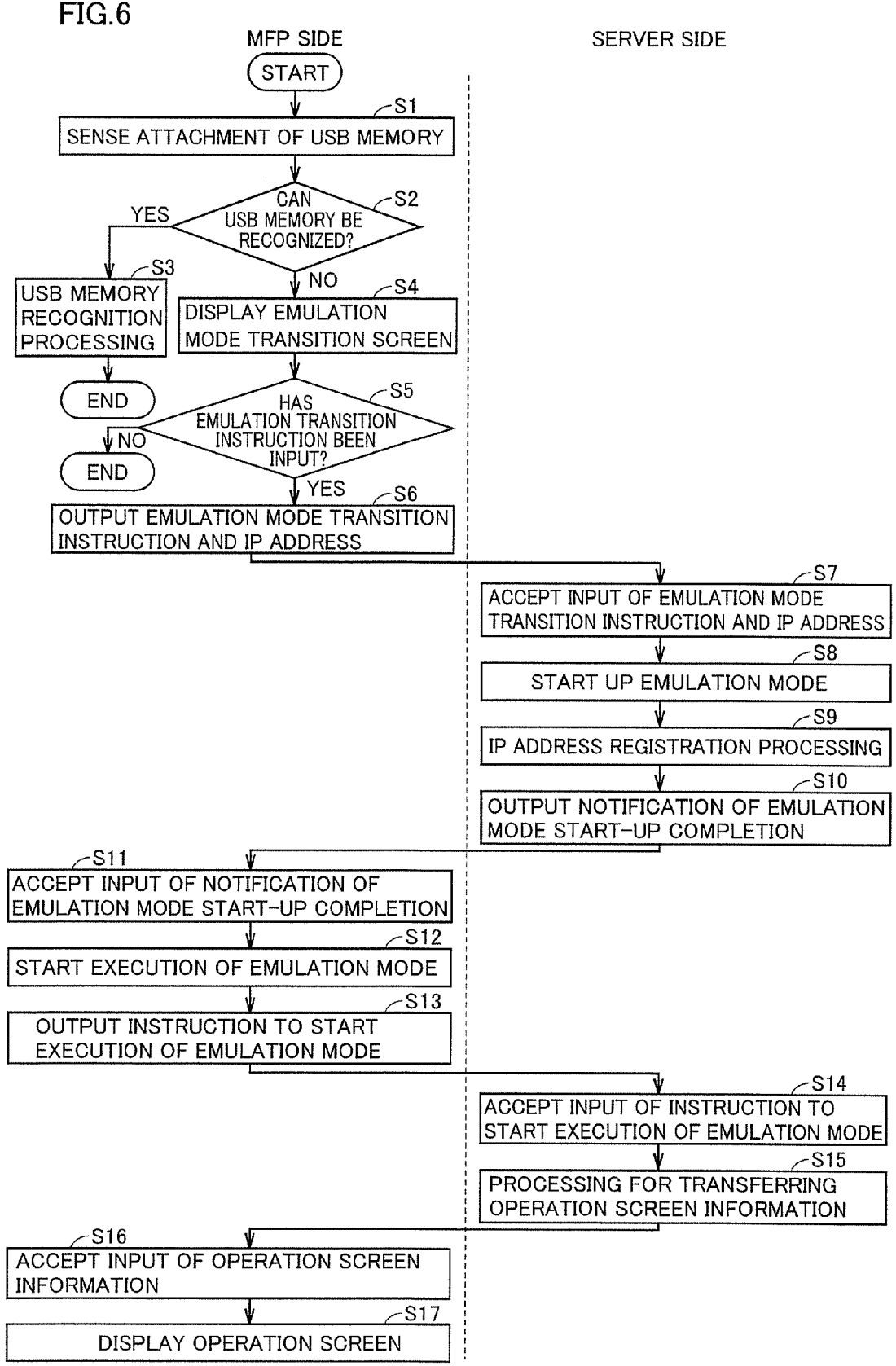
FIG. 6 is a flowchart illustrating processing for executing an emulation mode when a USB memory complying with the U3 specifications according to the embodiment of the present invention is attached to the MFP.

Referring to FIG. 6, initially on MFP 1 side, attachment of the USB memory is sensed (step S1). Specifically, USB device connection portion 5 senses attachment of the U3 memory attached to USB connector 20. Then, receiving input of sensing information from USB device connection portion 5, USB control unit 60 outputs data information output from the U3 memory to overall control unit 50 through USB device connection portion 5. It is noted that the data information output from the U3 memory is stored in a not-shown memory.

Then, overall control unit 50 determines whether the USB memory can be recognized or not, based on the data information output from the USB memory (step S2), In step S2, when the USB memory can be recognized based on the data information output from the USB memory, overall control unit 50 performs processing for recognizing the USB memory (step S3). Specifically, when the attached USB memory was successfully recognized, overall control unit 50 performs prescribed registration processing or the like so that a job involved with the USB memory can be executed through operation panel portion 10.

On the other hand, when the USB memory could not be recognized in step S2, overall control unit 50 gives an instruction to panel control unit 70 so that an emulation mode transition screen is displayed on operation display 12 of operation panel portion 10. Thus, panel control unit 70 causes operation display 12 to display the emulation mode transition screen (step S4).

An example where the emulation mode transition screen according to the embodiment of the present invention is displayed on operation display 12 will be described with reference to FIG. 7.

Figure 7:
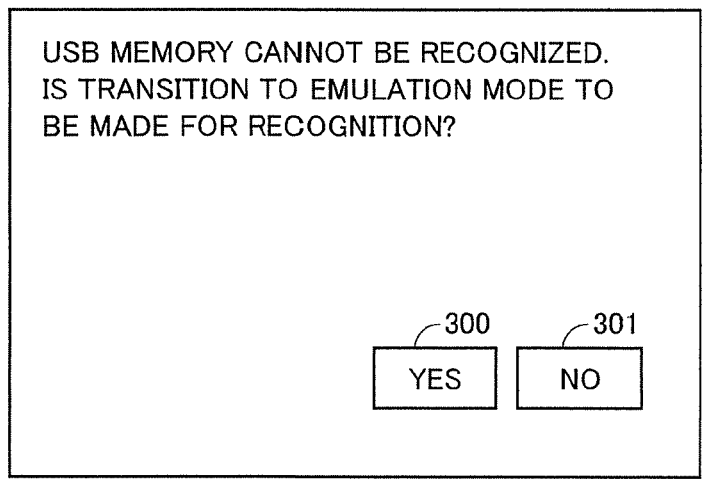
FIG. 7 is a diagram illustrating an example where an emulation mode transition screen according to the embodiment of the present invention is displayed on an operation display 12.

Referring to FIG. 7, buttons 300 and 301 urging the user to perform a selection operation as to whether to make transition to the emulation mode or not are displayed, together with an indication that "USB memory cannot be recognized. Is transition to emulation mode to be made for recognition?" For example, when the user presses button 300, transition to the emulation mode is started. On the other hand, when button 301 is pressed, transition to the emulation mode is canceled. Specifically, when pressing of button 300 is sensed through panel control unit 70, overall control unit 50 instructs emulation mode control unit 80 to start transition to the emulation mode.

On the other hand, when pressing of button 301 is sensed through panel control unit 70, overall control unit 50 ends recognition processing regarding the attached USB memory. Namely, the device attached to the USB connector is processed as an unrecognizable device and access or the like is prohibited.

Referring again to FIG. 6, subsequent to step S4, whether an instruction for transition to the emulation mode has been input or not is then determined (step S5). Specifically, as described above, when button 300 for starting transition to the emulation mode in FIG. 7 is sensed and an instruction to start transition to the emulation mode is given from overall control unit 50 to emulation mode control unit 80, an instruction signal for transition to the emulation mode and an IP address of MFP 1 on the network are output (step S6).

Specifically, receiving the instruction to start transition to the emulation mode from panel control unit 70, emulation transition/end unit 85 outputs the instruction signal for transition to the emulation mode and the IP address to server 1200 connected to the network through communication portion 65. It is noted that an IP address of server 1200 connected to the network, which is a destination from communication portion 65, is registered in advance.

Then, on server 1200 side, input of the instruction signal for transition to the emulation mode and the IP address is accepted (step S7). Specifically, emulation start-up/end unit 1290 in emulation mode control unit 1280 provided on server 1200 side accepts input of the instruction signal for transition to the emulation mode and the IP address.

Then, receiving the input of the instruction signal for transition to the emulation mode, emulation start-up/end unit 1290 starts up the emulation mode (step S8). Specifically, an indication that the emulation mode is set is output to overall control unit 1215. As a result of this processing, overall control unit 1215 of server 1200 performs processing in the emulation mode.

Thereafter, processing for registering the input IP address of MFP 1 is performed (step S9). Specifically, the IP address of MFP 1 is registered as a data destination address in server 1200. In the present embodiment, the IP address of MFP 1 is automatically registered as the data destination address in processing for executing a direct print program which will be described later.

Then, a notification signal of emulation mode start-up completion is output (step S10).

Specifically, emulation start-up/end unit 1290 outputs the notification signal of emulation mode start-up completion to MFP 1 through communication interface portion 1207 after the emulation mode is started up.

Thereafter, on MFP 1 side, input of the notification signal of emulation mode start-up completion is accepted (step S11). Specifically, emulation transition/end unit 85 in emulation mode control unit 80 provided on MFP 1 side accepts the input of the notification signal of emulation mode start-up completion.

Then, receiving the input of the notification signal of emulation mode start-up completion, emulation transition/end unit 85 starts execution of the emulation mode (step S12). Specifically, emulation transition/end unit 85 outputs an indication that the emulation mode is set to overall control unit 50. As a result of this processing, overall control unit 50 of MFP 1 performs processing in the emulation mode.

Then, emulation transition/end unit 85 outputs an instruction signal to start execution of the emulation mode to server 1200 through communication portion 65 (step S13).

Thereafter, emulation start-up/end unit 1290 in emulation mode control unit 1280 of server 1200 accepts input of the instruction signal to start execution of emulation (step S14).

Thereafter, processing for transferring operation screen information is performed (step S15).

Specifically, emulation start-up/end unit 1290 accepts the input of the instruction signal to start execution of emulation and outputs the instruction signal to overall control unit 1215. Receiving the input of the instruction signal to start execution of emulation, overall control unit 1215 instructs screen display control unit 1211 to output screen information on display contents similar to contents displayed on the operation screen of display 1205 (also referred to as operation screen information) to emulation mode control unit 1280. Then, output data control unit 1285 in emulation mode control unit 1280 transfers the operation screen information to MFP 1 through communication interface portion 1207.

Here, if the OS of server 1200 is a general-purpose OS and the OS of MFP 1 is an embedded OS, the type of OS is different. Therefore, overall control unit 50 of MFP 1 adapted to the embedded OS cannot perform the same processing using data the same as data on server 1200 side.

Therefore, output data control unit 1285 on the server side performs emulation processing so that the same processing as with the general-purpose OS can be performed with the embedded OS and transfers data to MFP 1.

Then, on MFP 1 side, input of the operation screen information is accepted (step S16).

Specifically, input data control unit 95 in emulation mode control unit 80 provided on MFP 1 side accepts input of the operation screen information.

Thereafter, operation display 12 of operation panel portion 10 displays the operation screen based on the operation screen information (step S17).

Specifically, receiving the operation screen information that has been subjected to emulation processing and output from input data control unit 95, overall control unit 50 outputs the operation screen information to panel control unit 70. Then, panel control unit 70 causes operation display 12 to display the operation screen based on the operation screen information.

The operation screen displayed on operation display 12 based on the operation screen information according to the embodiment of the present invention will be described with reference to FIG. 8.

Figure 8:
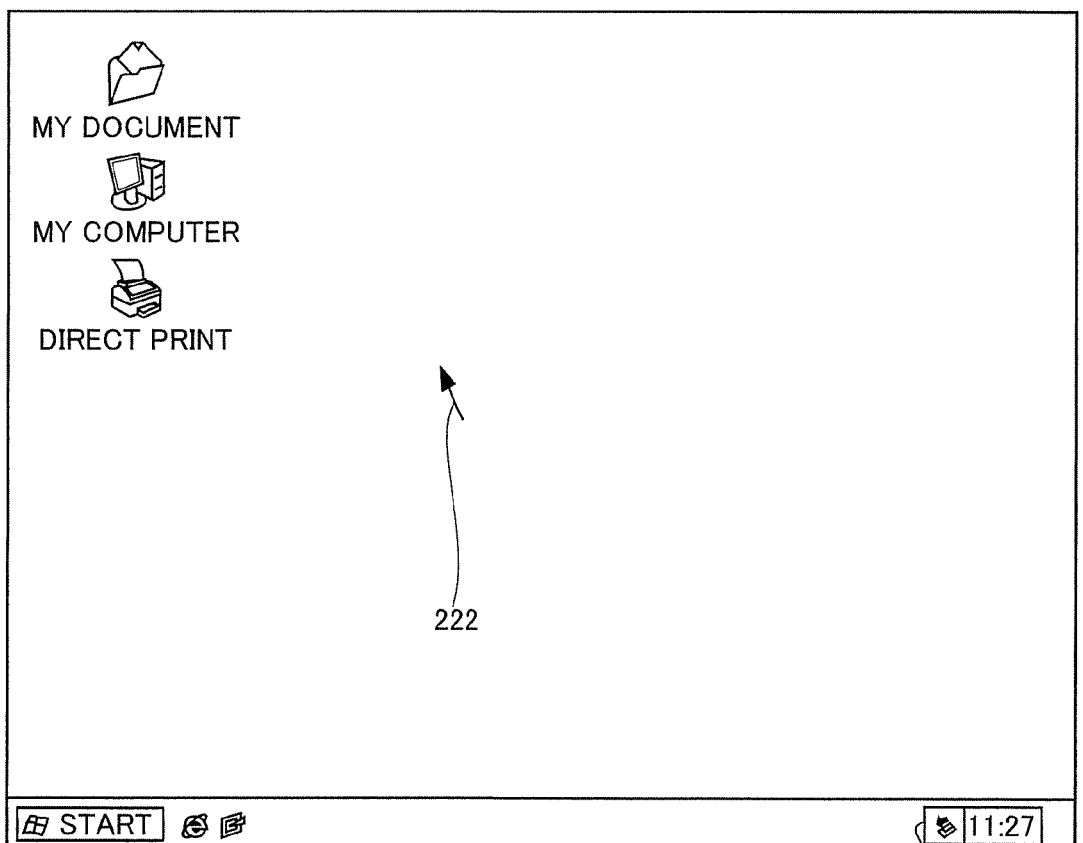
FIG. 8 is a diagram illustrating an operation screen displayed on the operation display based on operation screen information according to the embodiment of the present invention.

Referring to FIG. 8, an example where the operation screen identical in contents to the operation screen displayed on display 1205 of server 1200 is displayed as display contents on operation display 12 is shown here. The user can freely operate pointer 222 on the operation screen by operating trackball 220 described above. The selection operation can be performed by using start key 201 in operation panel portion 10.

Namely, the operation screen the same as the operation screen displayed on display 1205 of server 1200 is shown on operation display 12 of MFP 1, and the user can operate pointer 222 with trackball 220 and perform the selection operation by using start key 201. According to the configuration of the present embodiment, as a result of emulation processing by emulation mode control units 80 and 1280, the functions of input portion 1209 and display 1205 of server 1200 can be emulated on operation panel portion 10 of MFP 1, so that server 1200 is remotely operated.

Specifically, emulation mode control units 80 and 1280 are used to emulate display 1205 so that the operation screen of server 1200 input through communication portion 65, that is, the operation screen displayed on display 1205 of server 1200, is displayed on operation display 12 of operation panel portion 10.

In addition, input portion 1209 may be emulated so that the operation instruction input the same as the operation instruction input provided through input portion 1209 of server 1200 can be provided by operating operation panel portion 10.

As described above, if the OS of server 1200 is a general-purpose OS and the OS of MFP 1 is an embedded OS, the type of OS is different. Therefore, the operation instruction input through operation panel portion 10 on MFP 1 side cannot be processed as it is with the use of the general-purpose OS on server 1200 side.

Therefore, an operation instruction input signal output from output data control unit 90 in emulation mode control unit 80 on MFP 1 side is subjected to emulation processing so that the operation instruction input adapted to the embedded OS can be processed with the general-purpose OS in input data control unit 1300 in emulation mode control unit 1280 of server 1200 and then output to overall control unit 1215.

In the present embodiment, an example where emulation control unit 1280 on server 1200 side performs emulation processing in transmission so that processing by the embedded OS on MFP 1 side can be performed and performs emulation processing in reception so that the instruction signal from the embedded OS can be processed by the general-purpose OS is described. In contrast, however, emulation control unit 80 on MFP 1 side may perform emulation processing in transmission so that processing by the general-purpose OS on server 1200 side can be performed and perform emulation processing in reception so that the instruction signal from the general-purpose OS can be processed by the embedded OS.

Processing for starting up an application stored in the U3 memory described in connection with FIG. 5 in the emulation mode according to the embodiment of the present invention will now be described.

Processing for starting up an application stored in the U3 memory according to the embodiment of the present invention will be described with reference to FIG. 9

Figure 9:
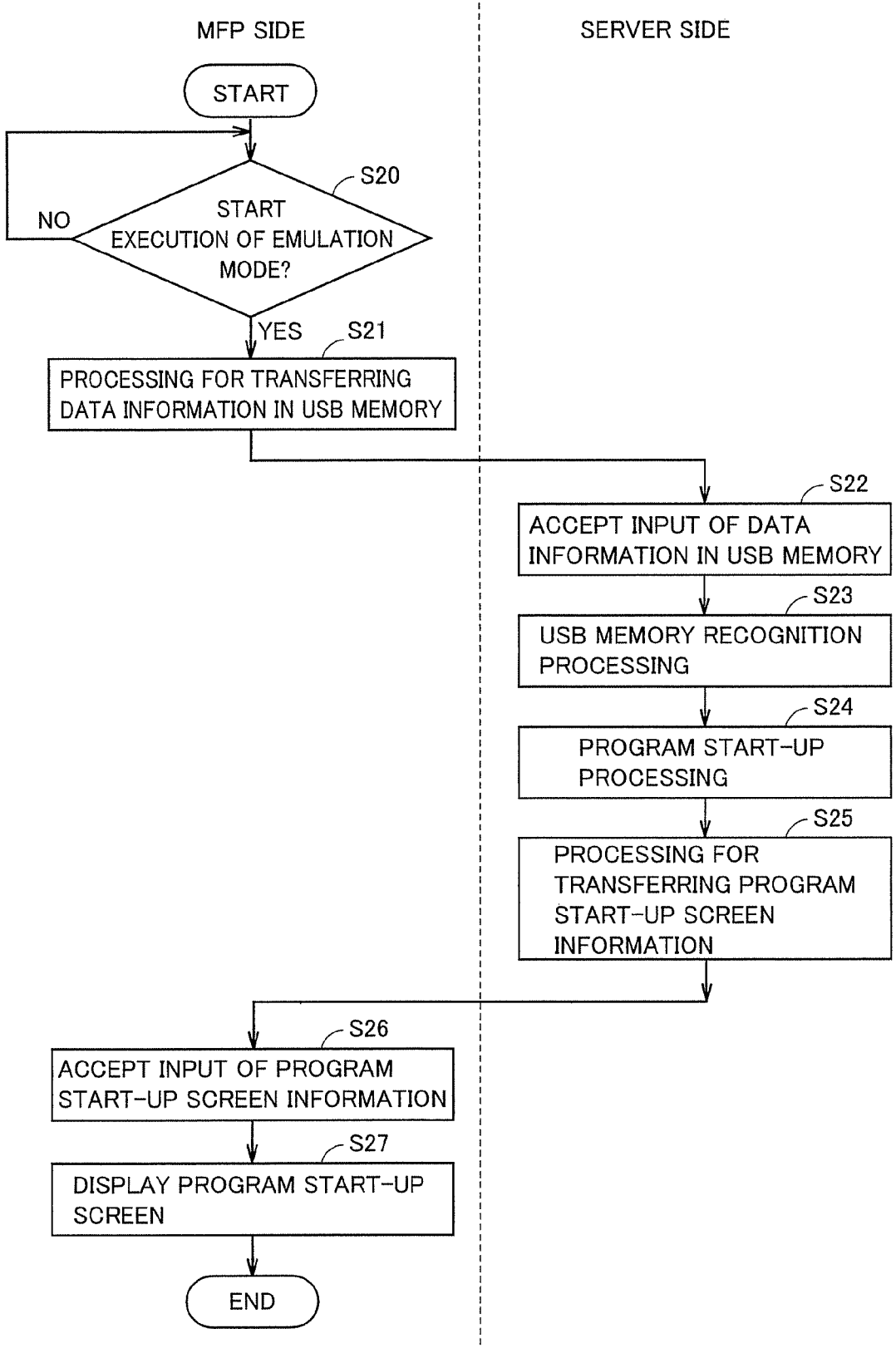
FIG. 9 is a flowchart illustrating processing for starting up an application stored in the U3 memory according to the embodiment of the present invention.

Referring to FIG. 9, overall control unit 50 determines whether execution of the emulation mode has been started or not (step S20). Specifically, in the flow in FIG. 6, emulation transition/end unit 85 accepts the input of the notification signal of emulation mode start-up completion (step S11) and thereafter execution of the emulation mode is started (step S12). Overall control unit 50 performs processing in the emulation mode in accordance with an instruction from emulation transition/end unit 85.

Thereafter, when execution of the emulation mode is started, overall control unit 50 performs processing for transferring the data information output from the U3 memory (step S21). In the flowchart in FIG. 6 above, an example where after execution of the emulation mode is started, the instruction signal to start execution of emulation is output, input of the operation screen information is accepted, and the operation screen is displayed on operation display 12 has been described. Meanwhile, in parallel to this processing, the processing in step S21 above is performed. It is noted that the processing in step S21 above may also be performed after the processing in the flow in FIG. 6 above ends.

Specifically, when attachment of the USB memory is sensed in step S1 in FIG. 6, since the data information output from the U3 memory is stored in a not-shown memory, processing for transferring the data information output from the U3 memory and stored in that memory is performed. Alternatively, as USB control unit 60 may perform processing for accessing the U3 memory attached to USB connector 20, overall control unit 50 may obtain again the data information output from the U3 memory and processing for transferring the data information output from the U3 memory and obtained again may also be performed. Here, overall control unit 50 outputs the data information output from the U3 memory to output data control unit 90 in emulation mode control unit 80.

Receiving input of the data information output from the U3 memory and output from overall control unit 50, output data control unit 90 transmits the data information to server 1200 connected to the network through communication portion 65.

Then, on server 1200 side, the input of the data information in the USB memory is accepted (step S22). Specifically, the data information is input to input data control unit 1300 in emulation mode control unit 1280 through communication interface portion 1207.

Then, the data information input to input data control unit 1300 is output to overall control unit 1215

Then, receiving the input of the data information in the U3 memory from input data control unit 1300, overall control unit 1215 performs processing for recognizing the USB memory (step S23).

In the present embodiment, overall control unit 1215 on server 1200 side functions as the general-purpose OS and it is adapted to the application in the USB memory complying with the U3 specifications.

Therefore, in the present embodiment, the U3 memory can be recognized by overall control unit 1215.

Specifically, receiving the input of the data information output from the U3 memory, overall control unit 1215 determines that the U3 memory was virtually attached to server 1200 in the emulation mode and it can recognize the U3 memory.

Then, when overall control unit 1215 successfully recognizes the U3 memory virtually attached to server 1200 in the emulation mode, overall control unit 1215 performs prescribed registration processing or the like so that a job involved with that USB memory can be executed.

Then, after overall control unit 1215 performs the processing for recognizing the U3 memory, overall control unit 1215 performs program start-up processing (step S24).

In the present embodiment, when the U3 memory is attached to USB connector 20 as described above, start-up data information of the encryption application which is an application complying with the U3 specifications is output.

Therefore, overall control unit 1215 performs program start-up processing based on the start-up data information.

Thereafter, processing for transferring information on a program start-up screen is performed (step S25).

Specifically, receiving a result of program start-up processing by overall control unit 1215, screen display control unit 1211 outputs the information on the program start-up screen for display on display 1205 to emulation mode control unit 1280.

Output data control unit 1285 in emulation mode control unit 1280 outputs the information on the program start-up screen from screen display control unit 1211 to MFP 1 connected to the network through communication interface portion 1207.

Thereafter, on MFP 1 side, input of the information on the program start-up screen transferred from server 1200 side is accepted (step S26). Specifically, input data control unit 95 in emulation mode control unit 80 accepts the input of the information on the program start-up screen.

Thereafter, the program start-up screen is displayed on operation display 12 of operation panel portion 10 (step S27).

An example where the program start-up screen is displayed on operation display 12 will be described with reference to FIG. 10.

Figure 10:
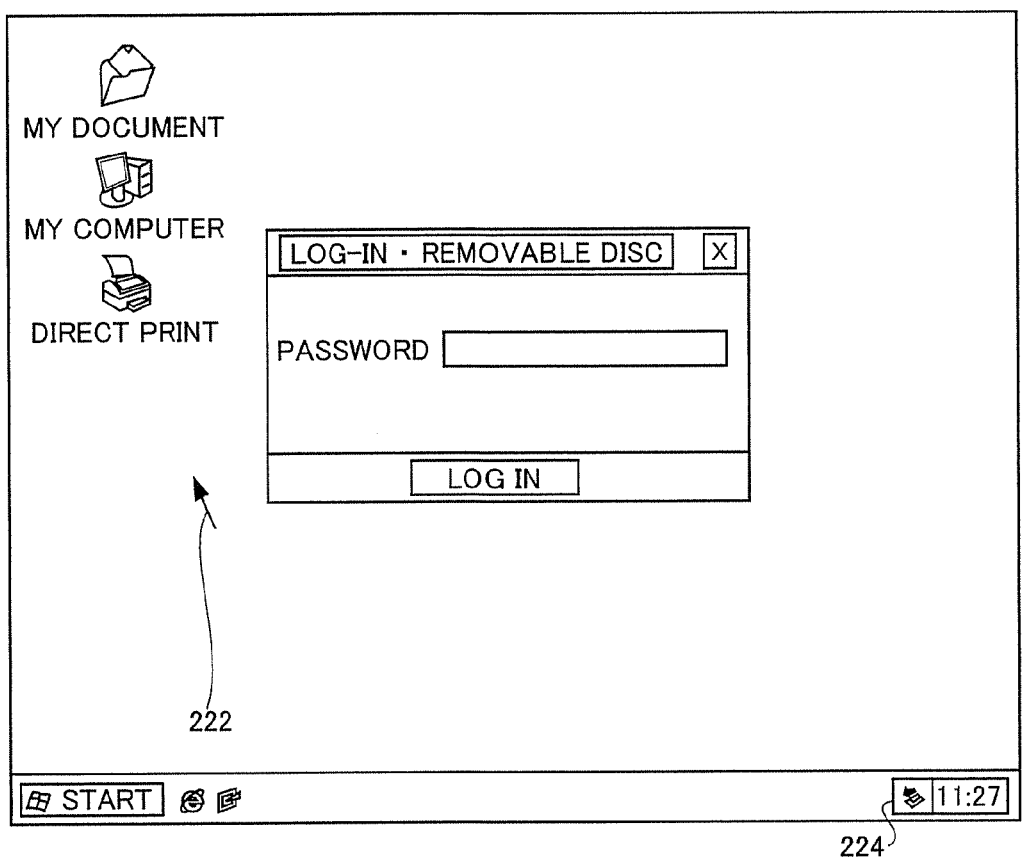
FIG. 10 is a diagram illustrating an example where a program start-up screen is displayed on the operation display.

Referring to FIG. 10, on the operation screen displayed on operation display 12 described in connection with FIG. 8, the program start-up screen is further displayed as the start-up data information of the encryption application stored in the U3 memory is started up.

In the present embodiment, a start-up screen for entering a password for log-in is shown as the program start-up screen.

In a lower right portion of operation display 12, a program start-up icon 224 is generated and displayed based on the start-up data information of the U3 memory.

As described above, server 1200 can remotely be operated through operation panel portion 10 of MFP 1 in accordance with emulation mode control unit 80 on MFP 1 side and emulation mode control unit 1280 on server 1200 side, and the state is such that virtual attachment of the U3 memory to server 1200 is recognized in the emulation mode. Processing on server 1200 side for causing operation panel portion 10 to emulate input portion 1209 of server 1200 will mainly be described hereinafter.

Processing for password entry will now be described.

Processing for user's password entry will be described with reference to FIG. 11.

Figure 11:
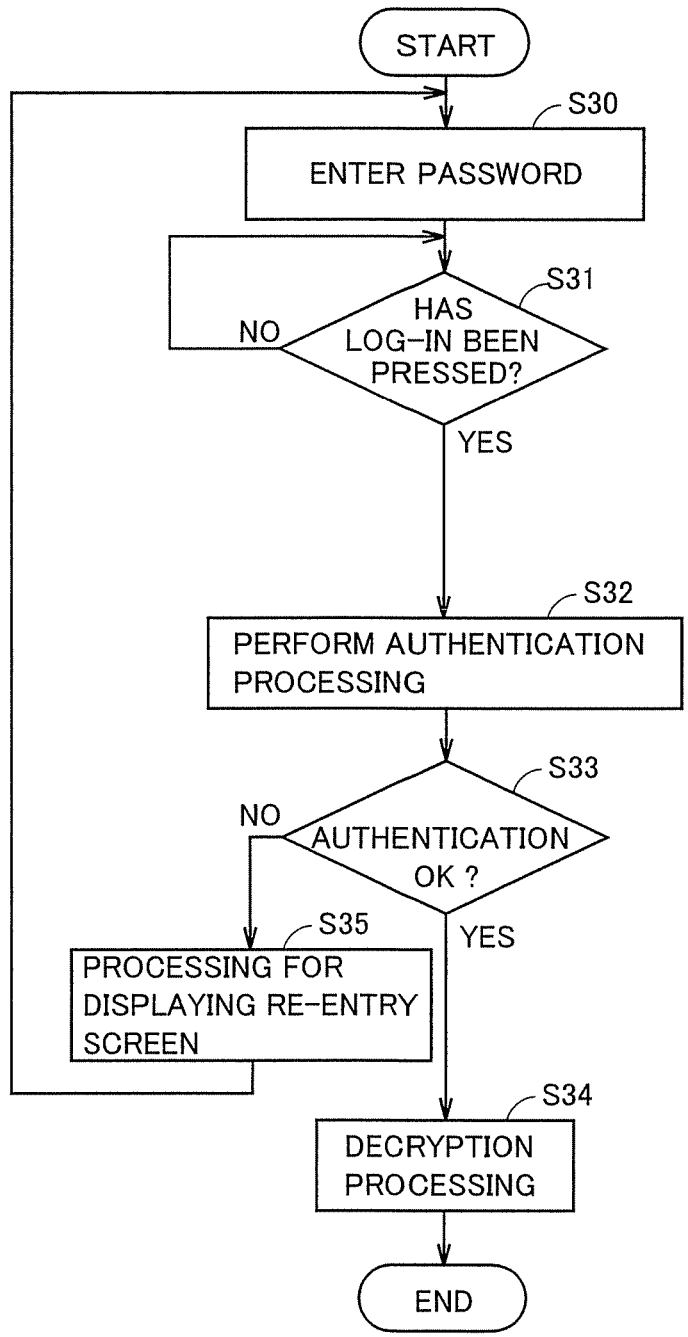
FIG. 11 is a flowchart illustrating processing for user's password entry.

Referring to FIG. 11, a password is entered (step S30). Specifically, a numeric password can be entered by using numeric key 202 of operation panel portion 10. In FIG. 10, a keyboard input screen may be displayed so that input through a keyboard serving as input portion 1209 of server 1200 can also be made also on operation display 12 of MFP 1, although not shown Then, a password may be entered by using the keyboard input screen.

Thereafter, overall control unit 1215 determines whether a log-in key in operation panel portion 10 has been entered or not (step S31). Specifically, password entry and log-in entry provided in operation panel portion 10 are sensed and overall control unit 1215 determines whether log-in entry has been provided or not. Then, when the log-in entry was provided, overall control unit 1215 performs authentication processing (step S32) Then, overall control unit 1215 determines whether authentication processing indicates OK or not based on password entry (step S33). When the authentication processing indicates OK, processing for decrypting encrypted data is performed (step S34). Then, the process ends (end).

On the other hand, when the authentication processing indicates NG in step S33, a re-entry screen is displayed (step S35). Here, the re-entry screen is displayed on operation display 12 of operation panel portion 10. Specifically, as described above, the program start-up screen described in connection with FIG. 10 is displayed again on operation display 12 and processing from step S30 described above is repeated as the user enters again a password.

In such processing, when authentication indicates OK in step S33, decryption processing is performed in step S34 and an encrypted image file stored in the data area described in connection with FIG. 5 is decrypted.

Through such processing, for example, regarding the USB memory having the data area and the application area such as a U3 memory, the application stored in the application area is developed on server 1200 side and server 1200 is remotely operated, so that encrypted data stored in the data area can be decrypted. Namely, as a result of decryption, access to the U3 memory is permitted.

An example where the image data file stored in the data area in the U3 memory is subjected to print processing will now be described.

A process flow for performing print processing of the image data file in the U3 memory according to the embodiment of the present invention will be described with reference to FIG. 12.

Figure 12:
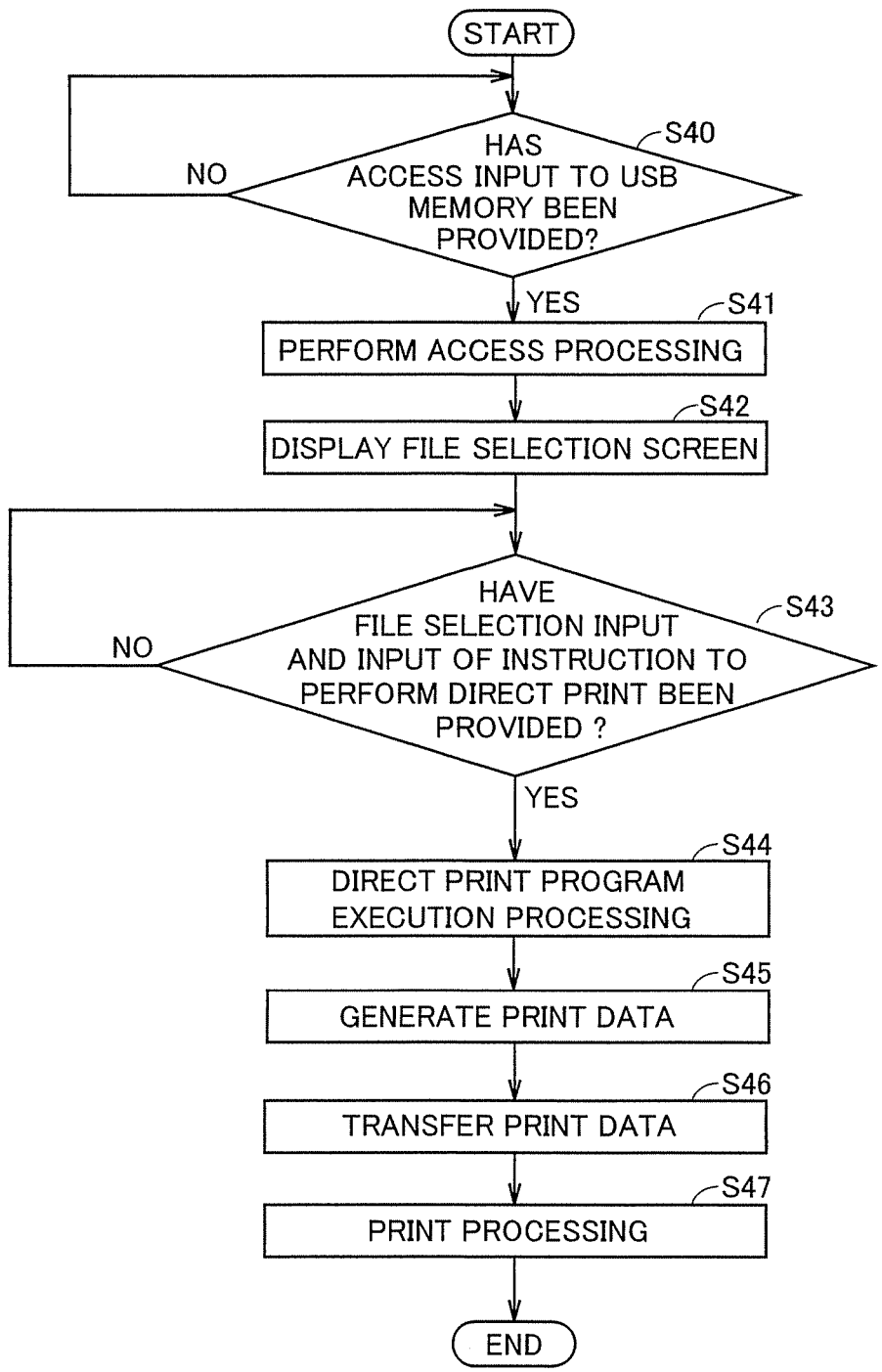
FIG. 12 is a diagram illustrating a process flow for performing print processing of an image data file in the U3 memory according to the embodiment of the present invention.

Referring to FIG. 12, initially, whether access input to the USB memory has been provided or not is determined (step S40). Specifically, overall control unit 1215 determines whether an instruction for access input to the USB memory has been provided through operation panel portion 10 or not.

An exemplary access input to the U3 memory is clicking or the like of program start-up icon 224 described in connection with FIG. 10 for accessing the U3 memory. Alternatively, an access input may be clicking of "My Computer" shown in FIG. 10 so that the U3 memory can be accessed through an icon allowing access to the recognized U3 memory.

When overall control unit 1215 determines in step S40 that the access input to the USB memory has been provided, access processing is performed (step S41).

Then, processing for accessing the USB memory is performed and a file selection screen for files stored in the USB memory is displayed (step S42). Specifically, in accordance with a USB access instruction from overall control unit 1215, USB control unit 60 of MFP 1 reads data from the attached USB memory for transfer to overall control unit 1215.

Then, overall control unit 1215 receives the data from the USB memory and instructs screen display control unit 1211 to display the file selection screen. Thus, the file selection screen is displayed on display 12 of operation panel portion 10.

The file selection screen displayed on operation display 12 will be described with reference to FIG. 13.

Figure 13:
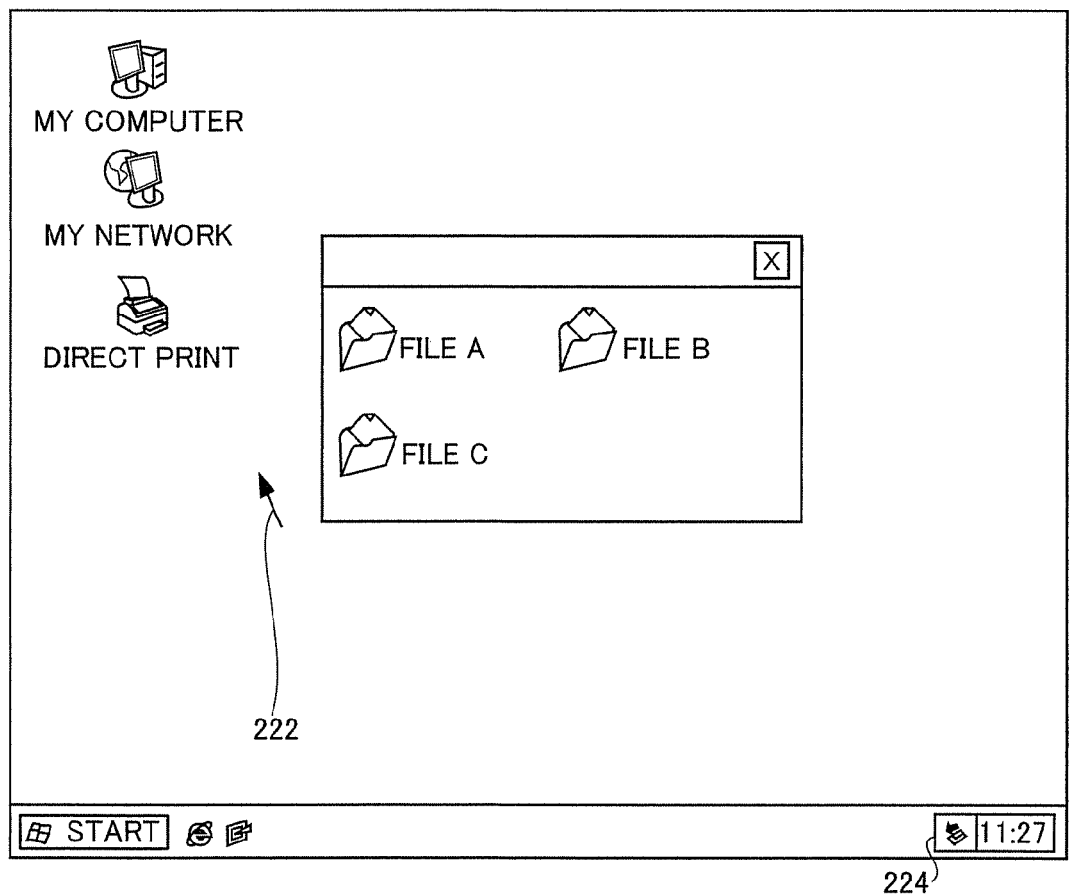
FIG. 13 is a diagram illustrating a file selection screen displayed on the operation display.

Referring to FIG. 13, an example where file data A to C stored in the USB memory are displayed in the file selection screen is shown here.

Referring again to FIG. 12, thereafter, whether file selection input and direct print execution instruction input have been provided or not is determined (step S43).

Specifically, for example, it is determined whether what is called a drag-and-drop operation, that is, processing for indicating selection of any one of file data A to C displayed in the file selection screen on operation display 12, moving (dragging) the file data over the screen of operation display 12, and releasing dragging (dropping) on an icon indicating a direct print command, has been performed or not.

When file selection input and direct print execution instruction input have been provided in step S43, direct print program processing is then performed (step S44). The direct print program is a program for directly transferring a print file to MFP 1, developing the transferred file to an image or the like in MFP 1, and starting print processing, without starting up such an application as a PDF (Portable Document Format) viewer, a JPEG (Joint Photographic Experts Group) viewer, or the like for an image data file.

By performing such processing, data for developing an image or the like in MFP 1 is generated (step S45) and transferred to MFP 1 (step S46). Specifically, print data is transmitted to output data control unit 90 through communication interface portion 1207.

In the present embodiment, as described in step S9 in FIG. 6, in processing for executing the direct print program, the IP address of MFP 1 is automatically registered as the data destination address and the print data is transmitted to MFP 1 located at the registered IP address.

Then, an image is developed in MFP 1, that is, print data is generated, and print processing is performed (step S47). Specifically, data is output from output data control unit 90 to overall control unit 50 and an image is developed, and print data is output to printer control unit 45.

Then, printer 14 performs print processing of designated file data, under the control of printer control unit 45 of MFP 1.

Therefore, through such processing, for example regarding a USB memory having the data area and the application area such as a U3 memory, the U3 memory attached to MFP 1 can be accessed from the server side so that print processing involved with the accessed U3 memory can be performed.

In the present embodiment, an example where the direct print program is executed is described. As in normal print processing, however, an image data file can also be developed into an image or the like on server 1200 to generate print data, and the print data can be transferred to MFP 1 for print processing.

End of the emulation mode will now be described.

The end of the emulation mode according to the embodiment of the present invention will be described with reference to FIG. 14.

Figure 14:
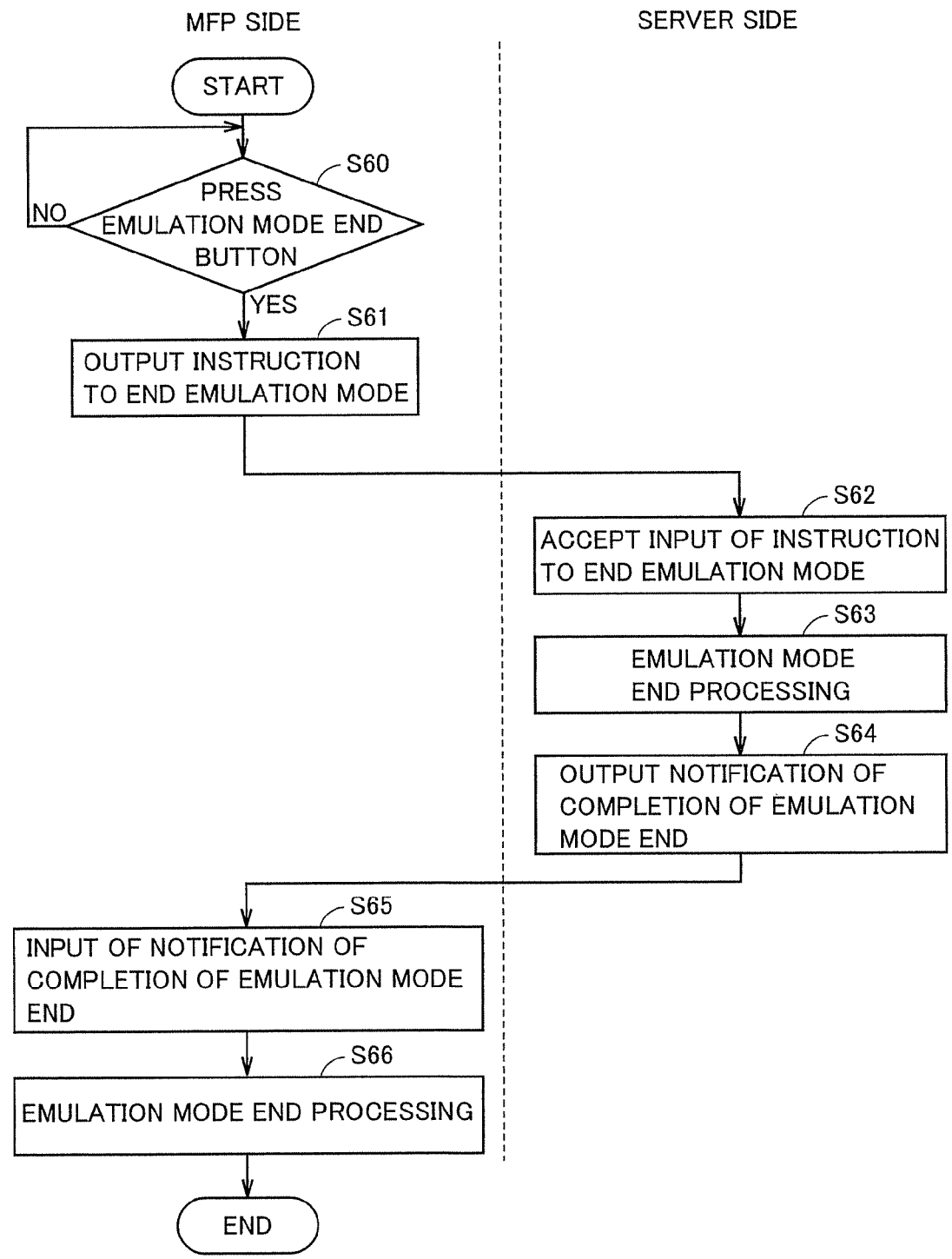
FIG. 14 is a flowchart illustrating end of the emulation mode according to the embodiment of the present invention.

Referring to FIG. 14, emulation transition/end unit 85 in emulation mode control unit 80 determines whether an emulation mode end button has been pressed or not (step S60). Specifically, whether emulation mode end button 223 in operation panel portion 10 described in connection with FIG. 3 has been pressed or not is determined.

When emulation mode end button 223 is pressed, emulation transition/end unit 85 outputs an instruction to end the emulation mode (step S61).

On the server side, input of the instruction to end the emulation mode is accepted (step S62). Specifically, emulation start-up/end unit 1290 in emulation mode control unit 1280 accepts the input of the instruction to end the emulation mode.

Then, emulation start-up/end unit 1290 performs emulation mode end processing (step S63). Specifically, an indication that the emulation mode ends is output to overall control unit 1215. As a result of this processing, overall control unit 1215 of server 1200 ends the emulation mode and performs normal processing.

Then, emulation transition/end unit 85 outputs notification of completion of emulation mode end (step S64).

On the MFP side, emulation transition/end unit 85 accepts input of notification of completion of emulation mode end (step S65). Then, on the MFP side, the emulation mode end processing is performed (step S66). Specifically, emulation transition/end unit 85 outputs to overall control unit 50, an indication that the emulation mode ends. As a result of this processing, overall control unit 50 of MFP 1 ends the emulation mode and performs normal processing.

As a result of this processing, a normal MFP operation screen described in connection with FIG. 3 is displayed on operation display 12 of panel control unit 10.

According to the technique in the embodiment of the present invention, for example, when the MFP side cannot recognize the USB memory complying with the U3 specifications, specifically, when an application stored in the USB memory complying with the U3 specifications is not adapted to the embedded OS of the MFP, transition to the emulation mode is made, data is transferred to the server side to have the server recognize the USB memory complying with the U3 specifications, and the MFP side remotely operates the server, Processing for accessing the USB memory complying with the U3 specifications can thus be performed. In addition, the USB memory complying with the U3 specifications can be accessed and print processing of the image data file in the USB memory can be performed by the MFP.

The USB memory complying with the U3 specifications where memory portion 110 is divided into the data area and the application area and data in the data area is stored as encrypted with the encryption application in the application area has been described above by way of example. In addition to encryption of data in the data area, an example where an application for locking access to the data area is stored in the application area is also similarly applicable. For example, when such an application is adapted to the general-purpose OS but not to the embedded OS of MFP 1, the present technique can be used to have the general-purpose OS recognize the application for unlocking, so that the data area can be accessed. In addition, the present technique is also similarly applicable to a USB memory, for example, not recognized by the embedded OS but recognized only by the general-purpose OS, without limited to the USB memory complying with the U3 specifications.

In addition, in the present embodiment, an example where the encryption application stored in the application area is started up has been described, however, another application may be stored in the application area and such an application may be started up and executed. For example, regarding start-up, by clicking program start-up icon 224 described in connection with FIG. 10, the U3 memory can be accessed and an application can selectively be started up from a list of applications stored in the U3 memory. In addition, processing or the like for unmounting the U3 memory can also be performed through program start-up icon 224.

In the present embodiment, an MFP including a plurality of connectors as USB connectors has been described, however, the MFP is not particularly limited as such. In particular, the number of connectors is not limited.

In the present embodiment, a configuration including trackball 220 in display 12 has been described, however, a configuration may include other various pointing devices, without limited to the trackball. For example, a touch panel may be used to attain similar functions.

An image processing apparatus according to the present invention is not limited to an MFP, and any image processing apparatus such as a printer or a facsimile machine may be adopted. Regarding a controller for controlling the image processing apparatus, a program causing a computer to function and carry out control as described in the flow above may be provided. Such a program may be recorded in a computer-readable recording medium such as a flexible disc, a CD-ROM (Compact Disk-Read Only Memory), a ROM (Read Only Memory), a RAM (Random Access Memory), and a memory card, to be attached to a computer, and may be provided as a program product Alternatively, a program may be provided as recorded in a recording medium such as a hard disk contained in a computer. Alternatively, a program may be provided by downloading through a network.

A program according to the present invention may invoke a necessary module from among program modules provided as a part of the operation system (OS) of the computer at prescribed timing in prescribed sequences and to cause the module to perform processing. Here, the program itself does not include the module above but processing is performed in cooperation with the OS. Such a program not including a module may also be encompassed in the program according to the present invention.

In addition, the program according to the present invention may be provided as incorporated as a part of another program In this case as well, the program itself does not include the module included in another program but processing is performed in cooperation with another program. Such a program incorporated in another program may also be encompassed in the program according to the present invention.

A provided program product is installed in a program storage portion such as a hard disk and executed It is noted that the program product includes a program itself and a recording medium recording a program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus, comprising:
   a connector to which a removable external storage device, having an application program recorded thereon, is attachable;
   a determination unit for determining whether the application program recorded on the removable external storage device is recognizable by said image processing apparatus based on information output from said removable external storage device attached to said connector;
   a display;
   an operation portion for accepting a user's operation input; and
   an emulation control unit for causing, when said determination unit determines that the application program recorded on the removable external storage device is not recognizable by said image processing apparatus because of a difference between an operating system to which said external storage device is adapted and an operating system of said image processing apparatus, said display and said operation portion to emulate a display function and an operation function of an external terminal device connected to said image processing apparatus via a network, in order to remotely operate said external terminal device that is capable of recognizing said application program recorded on the removable external storage device,
   said emulation control unit including a data input and output control unit for transmitting and receiving data to and from said external terminal device, and
   said data input and output control unit transferring information output from said removable external storage device to said external terminal device.

2. The image processing apparatus according to claim 1, wherein
   said emulation control unit further includes an emulation mode transition unit for switching to an emulation mode in which said display and said operation portion are caused to emulate the display function and the operation function of said external terminal device when said determination unit determines that the application program recorded on the removable external storage device is not recognizable by said image processing apparatus because of a difference between an operating system to which said external storage device is adapted and an operating system of said image processing apparatus.

3. The image processing apparatus according to claim 1, wherein
   said data input and output control unit includes
   a data output control unit for outputting the information output from said removable external storage device to said external terminal device, and
   a data input control unit for receiving input of operation screen information for causing said display to display an operation screen of said external terminal device for operating said application program recorded on the removable external storage device.

4. The image processing apparatus according to claim 3, wherein
   said data output control unit outputs an application program included in said removable external storage device to said external terminal device, and
   said data input control unit receives input of screen information for causing said display to display a screen displayed on the operation screen of said external terminal device based on the application program started up in said external terminal device.

5. The image processing apparatus according to claim 3, wherein
   said data input control unit receives input of screen information for causing said display to display an input screen for subjecting an encrypted data file included in said removable external storage device to decryption processing, and
   said data output control unit outputs to said external terminal device, input data for decryption processing of said encrypted data file input in accordance with the input screen displayed on the display of said image processing apparatus.

6. The image processing apparatus according to claim 3, wherein
   said data input control unit receives input of screen information for causing said display to display a file selection screen for performing print processing of a data file included in said removable external storage device, and
   said data output control unit outputs to said external terminal device, file selection input data for print processing of the data file input in accordance with the file selection screen displayed on the operation screen of said image processing apparatus.

7. An image processing system, comprising:
   an image processing apparatus; and
   an external terminal device connected to said image processing apparatus through a network,
   said image processing apparatus including
   a connector to which a removable external storage device, having an application program recorded thereon, is attachable,
   a determination unit for determining whether the application program recorded on said removable external storage device is recognizable by said image processing apparatus based on information output from said removable external storage device,
   a display,
   an operation portion for accepting a user's operation input, and
   an emulation control unit for causing, when said determination unit determines that the application program recorded on the removable external storage device is not recognizable by said image processing apparatus because of a difference between an operating system to which said external storage device is adapted and an operating system of said image processing apparatus, said display and said operation portion to emulate a display function and an operation function of said external terminal device, in order to remotely operate said external terminal device that is capable of recognizing said application program recorded on the removable external storage device,
   said emulation control unit including
   an emulation mode transition unit for switching to an emulation mode in which said display and said operation portion are caused to emulate the display function and the operation function of said external terminal device when said determination unit determines that the application program recorded on the removable external storage device is not executable by said image processing apparatus,
   a data output control unit for transferring the information output from said removable external storage device to said external terminal device, and
   a data input control unit for receiving input of operation screen information for causing said display to display an operation screen of said external terminal device for operating said application recorded on the external storage device, and said external terminal device including a control unit capable of recognizing the application program recorded on the removable external storage device attached to said connector based on the information output from said removable external storage device and transferred from said data output control unit, and a data control unit for outputting said operation screen information to said image processing apparatus when said control unit recognizes said application program recorded on the removable external storage device.

8. The image processing system according to claim 7, wherein said data output control unit of said image processing apparatus transfers said application program included in said removable external storage device to said external terminal device, said control unit of said external terminal device starts up transferred said application program, said data control unit of said external terminal device outputs screen information for causing said display to display a screen based on started-up said application program, and said data input control unit of said image processing apparatus receives from said external terminal device, input of the screen information to be displayed on said display.

9. The image processing system according to claim 7, wherein said data output control unit of said image processing apparatus transfers an encrypted data file included in said removable external storage device to said external terminal device, said control unit of said external terminal device starts up an application program for decrypting said encrypted data file, said data control unit of said external terminal device outputs screen information for causing said display to display an input screen for subjecting said encrypted data file to decryption processing based on started-up said application program, and said data input control unit of said image processing apparatus receives from said external terminal device, input of the screen information to be displayed on said display.

10. The image processing system according to claim 7, wherein said data output control unit of said image processing apparatus transfers information on a data file included in said removable external storage device to said external terminal device, said control unit of said external terminal device generates a file selection screen for performing print processing of the data file included in said removable external storage device based on transferred said information on said data file, said data control unit of said external terminal device outputs screen information for causing said display to display said file selection screen to said image processing apparatus, and said data input control unit of said image processing apparatus receives from said external terminal device, input of the screen information to be displayed on said display.

11. The image processing system according to claim 10, wherein said data output control unit of said image processing apparatus outputs to said external terminal device, file selection input data for print processing of the data file input in accordance with said file selection screen displayed on the operation screen of said image processing apparatus, said control unit of said external terminal device converts a selected data file included in said removable external storage device into print data based on said file selection input data, and said data output control unit of said external terminal device sets an address of said image processing apparatus in said emulation mode as a destination of processed print data.

12. A method of controlling an image processing apparatus, said image processing apparatus including a connector to which a removable external storage device, having an application program recorded thereon, is attachable, a display, and an operation portion for accepting user's operation input, comprising the steps of:

determining whether the application program recorded on the removable external storage device is recognizable by said image processing apparatus based on information output from said removable external storage device attached to said connector;

in response to determining that the removable external storage device is not recognizable by said image processing apparatus because of a difference between an operating system to which said external storage device is adapted and an operating system of said image processing apparatus, causing said display and said operation portion to emulate a display function and an operation function of an external terminal device connected to said image processing apparatus via a network in order to remotely operate said external terminal device that is capable of recognizing said application program recorded on the external storage device; and transmitting and receiving data to and from said external terminal device, and in said step of transmitting and receiving data, information of said removable external storage device attached to said connector is transferred.

\* \* \* \* \*